US006019903A

United States Patent [19]
Gallup

[11] Patent Number: 6,019,903
[45] Date of Patent: Feb. 1, 2000

[54] GEOTHERMAL BRINE PROCESSING

[75] Inventor: Darrell L. Gallup, Santa Rosa, Calif.

[73] Assignee: Union Oil Company of California, El Segundo, Calif.

[21] Appl. No.: 09/134,170

[22] Filed: Aug. 14, 1998

[51] Int. Cl.$^7$ ..................................................... C02F 5/08
[52] U.S. Cl. ......................... 210/696; 210/743; 210/747; 60/641.2; 166/310; 252/175
[58] Field of Search .................... 210/696, 747, 210/743; 60/641.2, 641.5; 166/300, 310; 252/175; 507/269

[56] References Cited

U.S. PATENT DOCUMENTS

| | | | |
|---|---|---|---|
| 4,500,434 | 2/1985 | Jost et al. .................................. | 210/696 |
| 4,615,808 | 10/1986 | Gallup et al. ............................ | 210/747 |
| 5,190,664 | 3/1993 | Gallup et al. ............................ | 210/696 |
| 5,656,172 | 8/1997 | Kitz et al. ................................. | 210/696 |

OTHER PUBLICATIONS

Gallup, D. L. "Iron Silicate Scale Formation and Inhibition at The Salton Sea Geothermal Field," Geothermics, vol. 18, No. 1/2, pp. 97–103, (1989).

Hoyer, D. et al., "Salton Sea Unit 2: Innovations and Successes," Geotherm. Res. Council, Trans., vol. 15, pp. 355–361, (Oct. 1991).

Gallup, D. L., "Combination Flash—Bottoming Cycle Geothermal Power Generation: A Case History," Proc. IECEC '96, vol. 3, pp. 1622–1625, (Aug. 11–16, 1996).

Gallup, D. L., "Combination Flash—Bottoming Cycle Geothermal Power Generation: A Case History," Geotherm. Res. Council, Bulletin, vol. 25, No. (7), pp. 264–270, (Jul. 1996).

Gallup, D. L., "Brine pH Modification Scale Control Technology," Geotherm. Res. Council, Trans., vol. 20, pp. 749–755, (Sep.–Oct. 1996).

Hoyer, D. P. et al., "Salton Sea Unit 2: Innovations and Successes," Geotherm. Sci. & Tech., vol. 5, pp. 155–169, (1997).

Gallup, D. L., "Combination Flash—Bottoming Cycle Geothermal Power Generation: Scale Inhibition at Bulalo Field," Facility: Mak–Ban, Philippines. Proc. 18th PNOC–EDC Geotherm. Conf., pp. 268–275, (Mar. 6–7, 1997).

Gallup, D. L., et al., "Low–Cost Silica, Calcite and Metal Sulfide Scale Control Through On–Site Production of Sulfurous Acid From $H_2S$ Or Elemental Sulfur," Geotherm. Res. Council, Trans., vol. 21, pp. 399–403, (Sep.–Oct. 1997).

Gallup, D. L. et al., "On–Site Production and Usage of Sulfurous Acid For Scale Inhibition," Proc. 19th PNOC–EDC Geotherm. Conf., pp. 191–198, (1998).

*Primary Examiner*—David A. Simmons
*Assistant Examiner*—Frank M. Lawrence
*Attorney, Agent, or Firm*—Gregory F. Wirzbicki

[57] ABSTRACT

A corrosive acid sulfate geothermal brine is mixed with a near neutral, bicarbonate geothermal brine containing above about 300 ppm silica to produce a relatively benign mixed brine of pH from about 4.5 to about 6.5 having reduced corrosivity as compared to the acid sulfate brine and a reduced tendency as compared to the near neutral, bicarbonate brine for depositing silica in equipment during brine processing.

32 Claims, No Drawings

GEOTHERMAL BRINE PROCESSING

BACKGROUND

Geothermal brine reservoirs exist in many areas of the world and represent a valuable energy resource. Typically, the energy contained in the hot geothermal brine is recovered in a geothermal power plant by flashing the brine to produce steam and then using the steam to activate a turbine connected to an electrical generator.

The geothermal brine presents handling difficulties in the geothermal power plant. For example, geothermal brines, and particularly those from a geothermal resource at a temperature of about 400° F. or more, are rich in silica, which can, by complex chemical reactions involving silica polymerization, come out of solution, forming solid amorphous silica deposits that scale equipment. These deposits are particularly troublesome with equipment designed to extract energy, e.g., flashing vessels and heat exchangers, but the silica in the brine also presents problems in any equipment or piping in which the brine is transported, including the piping for re-injection wells.

Indeed, silica deposition problems can even extend to the formation into which the brine is ultimately re-injected. If the silica substantially deposits soon after re-injection, the end result could be premature plugging of the formation, rendering it a useless or more difficult resource from which to recover geothermal fluids.

Likewise, the acidity of geothermal brines can present problems, in particular, corrosion problems. For example, brines at pH values below about 4.5 typically require expensive alloys for their handling, such as titanium or high nickel alloys. Oftentimes, the problem can be so severe, and the cost to handle the acid brine so expensive, that in many instances the "acid well" is shut in or used only as a re-injection well. Needless to say, such procedures decrease the energy resource base.

SUMMARY OF THE INVENTION

The present invention comprises blending an acid geothermal brine from one well source with a near neutral geothermal brine from another well source, the former presenting corrosion problems and the latter silica-scaling problems, to produce a benign geothermal brine of reduced corrosivity as compared to the acid brine and of reduced silica-scaling tendency as compared to the near neutral brine. Thus, in the present invention, two troublesome brines from different well sources are combined to produce a mixed brine of relatively benign properties.

In the best mode of the invention, the two brines are derived from two separate, high temperature geothermal resources. The first resource contains an acid sulfate geothermal brine at a pH below about 4.5. The second resource contains a near neutral, bicarbonate geothermal brine at a pH in the range of about 5 to 9 but having a sufficiently high silica content, i.e., above about 275 ppm, to present a silica-scaling problem. The two brines are mixed so as to produce a resultant, relatively benign mixed brine of pH from about 4.5 to about 6.0, most preferably from about 5 to about 6.

DETAILED DESCRIPTION OF THE INVENTION

Many geothermal brines have pH values below 4.5 and thus present corrosion problems for carbon steel equipment. The corrosivity of such brines increases with decreasing pH, and those having pH values below 3.5 are especially corrosive.

The present invention is most particularly concerned with "acid sulfate brines," herein defined as geothermal brines recovered at the surface from a geothermal reservoir at a pH of about 4.5 or less and containing sulfate in a concentration of at least 100 ppm. Typical acid sulfate brines have a pH less than about 3.5, usually on the order of 3.0, i.e., in a range of about 2.5–3.5. The sulfate concentration is usually above 200 ppm, typically in the 500–1000 ppm range, but oftentimes much higher, e.g., as high as 1500 ppm or higher. Acid sulfate brines normally contain magnesium dissolved in a concentration of 1 ppm or more, aluminum dissolved in a concentration of 10 ppm or more, and bicarbonate in a concentration below 10 ppm, and usually less than 1 ppm.

The invention is also particularly concerned with "near neutral, bicarbonate brines," herein defined as geothermal brines recovered at the surface from a geothermal reservoir at a pH of about 5 to about 9 and containing bicarbonate in a concentration of 25 ppm or more. Typical near neutral, bicarbonate brines contain bicarbonate in a concentration greater than 100 ppm, usually in the 100–200 ppm range, with values above 250 ppm, e.g., in the range of 300 to 400 ppm, or higher, being not uncommon. The sulfate concentration of near neutral, bicarbonate brines is less than 100 ppm, usually about 25–50 ppm; the magnesium content is normally less than 1.0, usually below about 0.1 ppm; and the aluminum content is normally less than 10, usually below about 5 ppm.

Geothermal brines naturally contain silica as a result of quartz dissolution. Some geothermal brines from a low temperature resource, e.g., on the order of 300° F. or less, contain silica in concentrations as low as about 130 ppm. As a rule, such brines can be readily handled in surface equipment without silica-scaling being a major problem. However, when the silica concentration is above about 275 ppm, as is the case with a near neutral, bicarbonate brine derived from a high temperature resource, e.g., typically 400° F. or more, usually 500° F. or more, the brine will be scale forming, particularly when employed in energy extraction equipment. The scale-forming tendency of such brines increases as the silica concentration increases, e.g., near neutral, bicarbonate brines of silica concentration above 500 ppm will pose more of a scaling problem than those below that value.

In the invention, an acid sulfate brine and a near neutral, bicarbonate brine containing above about 275 ppm silica are combined. The resultant mixed brine stream will necessarily have an increased pH as compared to the acid sulfate brine but a decreased pH as compared to the near neutral, bicarbonate brine. Preferably, the two brines are combined so that the resultant mixed brine has a pH in the range of about 4.5 to about 6, and more preferably from about 5 to about 6. The mixed brine will be less corrosive to carbon steel than the original acid sulfate brine. Likewise, the resultant mixed brine will have a reduced tendency for depositing silica scale as compared to the original near neutral, bicarbonate brine of silica content above about 275 ppm.

Generally, the combining of the acid sulfate brine and the near neutral, bicarbonate brine to produce the mixed brine is accomplished by blending brine streams of each as recovered after initial separation of steam. Usually, a geothermal brine drawn from the reservoir begins to flash to steam as it comes up the production well, producing a two-phase steam/brine fluid. Preferably, the steam thus produced is separated from the brine at the surface, so that the blending of the two brine streams is accomplished by blending two single phase liquid streams essentially immediately after each has been recovered from an appropriate gas/liquid (i.e., steam/brine)

separation vessel. Alternatively but less preferably, one could combine a two phase steam/acid sulfate brine from a first production well with a two phase steam/near neutral, bicarbonate brine from a second production well to produce the mixed brine, followed by separation of brine and steam. This embodiment avoids corrosion and silica scaling problems in the separation vessels needed to recover the steam produced in the wells as the two brines are brought to the surface. Alternatively still, one of the two brines can be a one phase liquid stream as recovered from the steam/brine separation vessel in which steam produced in the well is recovered while the other is a two-phase fluid as drawn up the well prior to steam separation.

In yet another embodiment of the invention, when reduction in the corrosivity of the acid sulfate brine is important upstream from the location where it is to be combined with the near neutral, bicarbonate brine, the acid sulfate brine is admixed with a corrosion inhibitor. For example, a corrosion inhibitor can be injected into the two phase steam/acid sulfate brine deep within the well from which the acid sulfate brine is being withdrawn, so as to reduce corrosion in the well and equipment leading up to the location where the acid sulfate brine is combined with the near neutral, bicarbonate brine. The preferred corrosion inhibitors for this purpose are oil soluble, water dispersible organic amines, such as the commercial materials sold under the designations Chemco 6816 and Cronox 9029, with the latter being most preferred. Alternatively, a base may be added, such as sodium hydroxide, lime, soda ash, magnesia, and ammonia, to lower the acidity and hence the corrosivity of the acid sulfate brine prior to combination with the near neutral, bicarbonate brine.

The following Table I presents results showing the corrosion rate reductions in mils per year (mpy) for carbon steel when one injects sodium hydroxide into a two-phase brine/steam fluid flowing from an acid sulfate geothermal reservoir at a pH of 3.8:

TABLE I

| Treatment | pH | Corrosion Rate, mpy | Corrosion Rate Reduction |
|---|---|---|---|
| None | 3.8 | 185 | |
| 3 ppm NaOH | 3.8 | 185 | 0 |
| 15 ppm NaOH | 4.2 | 99 | 46 |
| 30 ppm NaOH | 5.4 | 0 | 100 |

Similarly, the following Table II shows the results from a second series of tests with two phase acid sulfate brine/steam fluids (from the same acid sulfate geothermal reservoir as in Table I) using three commercially available filming corrosion inhibitors, each of which is believed to contain as the effective agent an oil soluble, water dispersible organic amine compound:

TABLE II

| Treatment | Corrosion Rate, mpy | Corrosion Rate Reduction, % |
|---|---|---|
| None | 185 | |
| 10 ppm Chemco 6816 | 76 | 59 |
| 2.9 ppm Chemco 6816 | 85 | 54 |
| 10.9 ppm Cronox 9029 | 56 | 70 |
| 3.2 ppm Cronox 9029 | 41 | 78 |
| 10 ppm CI-15 | 320 | 0 |
| 3 ppm CI-15 | 229 | 0 |

The foregoing data show that the corrosion rate can be substantially reduced—to zero when using a base sufficient to raise the pH above about 5.0. If the pH is kept below about 4.5, the data shown in Tables I and II indicate that, although none of the treatments reduced the corrosion rate to zero, Cronox 9029, Chemco 6816, and caustic were effective in substantially reducing the corrosion rate, with Chemco 6816 being more effective than caustic and Cronox 9029 being more effective than either Chemco 6816 or caustic. (Note: none of the amine compounds in Table II employed in the concentrations therein shown has any significant effect upon the pH of the acid sulfate brine.)

Thus, it is within the invention to add corrosion inhibitors or neutralizers to the acid sulfate brine to extend the life of the production lines, well casings, and surface production piping and equipment prior to the location where the acid sulfate brine is combined with the near neutral, bicarbonate brine. However, one could alternatively avoid adding such chemicals by using a high alloy material (titanium-based alloys or nickel-based alloys such as Inconel or Hastelloy) upstream of where the two brines are combined. Alternatively again, the corrosion inhibitor could be added in an amount sufficient to substantially reduce the corrosion rate so that a less expensive alloy (e.g., stainless steel) becomes the material of choice for use upstream of where the two brines are combined.

However, adding commercial chemicals of any kind in a continuous process, as is the case with processing geothermal fluids for extraction of energy, represents a continuous cost to be avoided or lessened, if possible. Accordingly, one of the advantages flowing from the invention is that, instead of using a commercial chemical inhibitor or base for lowering the corrosivity of the acid sulfate brine in its production well, one can inject deep in the acid sulfate well some of the near neutral, bicarbonate brine. This embodiment of the invention is especially useful when the pH of the near neutral brine is at the high end of the 5.0–9.0 range, i.e., about 7.5 to about 9.0. Injection of such "high pH" near neutral, bicarbonate brines into the well bore of the acid sulfate wells serves the purpose of initially raising the pH of the acid sulfate brine to render it less corrosive prior to being subsequently combined with more of the near neutral, bicarbonate brine to yield the desired mixed brine of pH between 4.5 and 6.0. However, where possible and practicable, it is preferred that the near neutral, bicarbonate brine be mixed entirely with the acid sulfate brine/steam fluid in the acid sulfate brine well to yield in situ the desired mixed brine of pH between 4.5 and 6.0. In such case, when the near neutral, bicarbonate brine also contains above about 275 ppm silica, the overall greatest advantage of the invention is realized, i.e., two naturally-occurring, troublesome, and chemically untreated geothermal brines are combined so as to produce a more benign brine—more benign as to corrosion when compared to one of the two brines and more benign as to depositing silica as compared to the other—while substantially reducing corrosion in the acid sulfate well.

As can be seen from the foregoing, there are a number of ways the invention can be carried out to advantage. Depending upon the particular situation facing the operator of the geothermal power plant, the invention may be used in conjunction with (or in the absence of) commercial corrosion inhibitors or in conjunction with various corrosion-resistant materials to handle the acid sulfate brine up to the point where the mixed brine is produced. Moreover, the combining of the two brines can be accomplished in a single step, or in multiple steps, e.g., by blending a number of streams of the near neutral, bicarbonate brine into the acid sulfate brine (or vice versa) to provide the mixed brine of 4.5–6.0 pH. Alternatively still, the combining can be accomplished while the brine is in a two-phase fluid including steam flashed therefrom, or after separation of the steam. Thus, in general, the manner in which the combining is accomplished is not critical, so long as the pH of the resultant mixed brine is controlled to be in the range of about 4.5 to about 6.0.

The mixed brine, being relatively more benign than either of the two brines combined to form it (i.e., either the acid sulfate brine or the near neutral, bicarbonate brine of more than about 275 ppm silica content), is therefore more suitable for further processing, particularly in equipment designed to extract energy from the brine at elevated temperatures, e.g., at or above 300° F. Thus, after it is produced, the mixed brine will normally be introduced into such energy extraction equipment as flashing vessels and/or heat exchangers where temperatures on the order of 300° F. or more will be encountered, after which it will usually be further processed and ultimately re-injected into the geothermal formation. It is noted that, in the most typical case contemplated, both the acid sulfate brine and the near neutral, bicarbonate brine will be at an elevated temperature, generally above 3000 F. at the time of their mixing to produce the mixed brine. Hence, the mixed brine will therefore contain heat energy available for transfer to another fluid or for flashing into steam.

As used herein, "ppm" refers to ppm by weight (mg/kg) of a component in solution (including supersaturation) in the brine. All concentrations in ppm of a component in either the acid sulfate brine or the near neutral, bicarbonate brine refer to the concentrations of the respective components in solution in the brine in the geothermal reservoir from which the respective brine was produced. Likewise, the pH of the acid sulfate brine and the pH of the near neutral, bicarbonate brine are determined for the brine in the reservoir. Both the pH and the concentration of any component discussed herein (e.g., sulfate, bicarbonate, etc.) for a brine in a geothermal reservoir can be determined by well known back calculation methods from analyses of samples of the brine taken at the surface. (Normally, the concentration of a particular component in the brine at the surface will be higher than that for the reservoir, while the pH in the brine at the surface will generally be higher than that for the reservoir in the case of near neutral, bicarbonate brines and less that that for the reservoir in the case of acid sulfate brines.) For the mixed brine, the pH value is determined at the surface based upon direct pH analysis of the mixed brine itself. If the mixed brine is in the form of a two phase brine/steam fluid, the steam would first be flashed from the brine, and the resultant brine-i.e., the mixed brine for purposes herein—would be measured for pH. All "silica" concentrations herein are the values obtainable by measuring for Si by spectroscopic techniques, e.g., atomic adsorption or ICP, followed by multiplication by the gravimetric factor of 2.14 to obtain the "SiO2" concentration.

Although the invention has been described in conjunction with preferred embodiments and alternatives thereto, it is apparent that many alternatives, modifications, and variations of the invention will be apparent to those skilled in the art in light of the foregoing description. For example, as described above, near neutral, bicarbonate brines having a silica content less than about 130 ppm are essentially non-scaling while those having a silica content above about 275 ppm are scaling. However, some near neutral, bicarbonate brines having a silica content between about 130 and about 275 ppm, e.g., from 150 to 275 ppm, may exhibit silica-scaling tendencies, depending on a number of factors, such as the amount of steam flashed from the brine as the brine is brought to the surface, the temperature drop involved in the flashing, the salinity of the brine, and the silica concentration of the brine. Thus, near neutral, bicarbonate brines which are silica-scaling even though containing only 130 to 275 ppm silica may be employed as described above for those having more than 275 ppm silica—i.e., combined with an acid sulfate brine to obtain the benefit of a mixed brine having a reduced silica scaling tendency as compared to the near neutral, bicarbonate brine and a reduced corrosivity as compared to the acid sulfate brine. Accordingly, all such alternatives, modifications, and variations as fall within the scope of any of the following claims are embraced within the invention claimed.

I claim:

1. A process comprising
   (1) mixing
      (a) a first geothermal brine produced from a brine in a first geothermal reservoir having a pH below about 4.5 and containing at least 100 ppm by weight of sulfate, said geothermal brine being corrosive to carbon steel, with
      (b) a second geothermal brine derived from a brine in a second geothermal brine reservoir having a pH from about 5 to about 9 and containing at least 25 ppm by weight of bicarbonate and above about 275 ppm by weight of silica but less than 100 ppm by weight of sulfate,
      said mixing being under conditions yielding a mixed brine having a pH in the non-corrosive range of about 4.5 to about 6.0 and a reduced tendency for depositing silica scale as compared to said second geothermal brine, and
   (2) extracting energy from said mixed brine in equipment comprising carbon steel without substantial deposition of silica scale.

2. A process comprising
   (1) mixing
      (a) a first geothermal brine produced from a brine in a first geothermal reservoir having a pH below about 4.5 and containing at least 100 ppm by weight of sulfate with
      (b) a second geothermal brine produced from brine in a second geothermal reservoir having a pH from about 5 to about 9 and containing at least 25 ppm by weight of bicarbonate and above about 275 ppm by weight of silica but less than 100 ppm by weight of sulfate,
      said mixing producing a mixed brine having a pH in the range of about 4.5 to about 6.0, and
   (2) contacting said mixed brine with carbon steel at a temperature above about 3000 F without substantial deposition of silica scale.

3. A process as defined in claim 2 wherein said mixing comprises blending a plurality of streams of said first geothermal brine with said second geothermal brine.

4. A process as defined in claim 2 wherein said mixing comprises blending a plurality of streams of said second geothermal brine with said first geothermal brine.

5. A process as defined in claim 2 wherein said mixed brine is introduced into a surface heat exchanger to exchange heat with another fluid.

6. A process as defined in claim 2 wherein said mixing comprises blending at least some of said second geothermal brine with said first geothermal brine in a lower portion of a well producing said first geothermal brine from said first geothermal reservoir.

7. A process as defined in claim 6 wherein the pH of said brine in said second geothermal reservoir is between about 7.5 and about 9.0.

8. A process as defined in claim 2 wherein said mixing consists essentially of blending said second geothermal brine with said first geothermal brine in a lower portion of a well producing said first geothermal brine from said first geothermal reservoir.

9. A process as defined in claim 8 wherein the pH of said brine in said second geothermal reservoir is between about 7.5 and about 9.0

10. A process as defined in claim 2 wherein said first geothermal brine is contained in a two phase brine/steam fluid.

11. A process as defined in claim 2 wherein the brine in the first geothermal reservoir has a pH less than 3.5, a sulfate concentration above 200 ppm, and a bicarbonate content less than 10 ppm, and the brine in the second geothermal reservoir contains bicarbonate in a concentration above 100 ppm, a sulfate concentration less than 25 ppm, a magnesium content below 1.0 ppm, and an aluminum content less than 10 ppm.

12. A process as defined in claim 2 wherein a corrosion inhibitor is introduced into a lower portion of a production well producing said first geothermal brine.

13. A process as defined in claim 12 wherein the corrosion inhibitor is introduced at a rate sufficient to reduce the corrosion rate to carbon steel of said first geothermal brine by at least 45%.

14. A process as defined in claim 12 wherein the corrosion inhibitor is introduced at a rate sufficient to reduce the corrosion rate to carbon steel of said first geothermal brine by at least 50%.

15. A process as defined in claim 12 wherein the corrosion inhibitor is introduced at a rate sufficient to reduce the corrosion rate to carbon steel of said first geothermal brine by at least 70%.

16. A process as defined in claim 12, 13, 14, or 15 wherein the corrosion rate reduction is less than 100%.

17. A process as defined in claim 12, 13, 14, or 15 wherein the corrosion rate reduction is less than 80%.

18. A process for reducing the deposition of silica from a first hot geothermal brine produced from brine in a first geothermal reservoir having a pH from about 6 to about 9 and containing at least 25 ppm by weight of bicarbonate and above 275 ppm by weight of silica but less than 100 ppm by weight of sulfate, said process comprising mixing said first hot geothermal brine with a second hot geothermal brine produced from brine in a second geothermal reservoir having a pH below about 4.5 and containing at least 100 ppm by weight of sulfate to produce a mixed geothermal brine having a pH of about 4.5 to about 6.0.

19. A process comprising mixing a first geothermal brine from an acid sulfate geothermal reservoir with a second brine from a near neutral, bicarbonate geothermal reservoir containing silica in a concentration above 275 ppm to produce a mixed geothermal brine, with the ratio of the first geothermal brine to the second geothermal brine in the mixed brine being such that the pH of said mixed geothermal brine is in the range of about 4.5 to about 6.0.

20. A process as defined in claim 1, 2, 3, 4, 5, 6, 7, 8, 9, 10, 11, 18, or 19 wherein said first and second geothermal brines are chemically untreated prior to said mixing.

21. A process as defined in claim 2 wherein said mixing comprises blending a plurality of streams of said second geothermal brine with a plurality of streams of said first geothermal brine.

22. A process comprising mixing a first geothermal brine from an acid sulfate geothermal reservoir with a second brine from a near neutral, bicarbonate geothermal reservoir containing silica in a silica-scaling concentration above 130 ppm to produce a mixed geothermal brine, with the ratio of the first geothermal brine to the second geothermal brine in the mixed brine being such that the pH of said mixed geothermal brine is in the range of about 4.5 to about 6.0.

23. A substantially non-corrosive, non-silica depositing geothermal brine composition having a pH of about 4.5 to about 6.0 comprising a mixture of (1) a corrosive geothermal brine from brine in a first geothermal reservoir having a pH below about 4.5 and containing at least 100 ppm by weight of sulfate with (2) a silica-depositing geothermal brine from brine in a second geothermal reservoir having a pH from about 5 to about 9 and containing at least 25 ppm by weight of bicarbonate and above 275 ppm by weight of silica but less than 100 ppm by weight of sulfate.

24. A geothermal brine composition as defined in claim 23 wherein neither said corrosive geothermal brine nor said silica-depositing geothermal brine has been chemically treated.

25. A geothermal brine composition having a pH between about 4.5 and about 6.0 comprising a mixture of an acid sulfate brine and a near neutral, bicarbonate brine containing above about 275 ppm silica.

26. A geothermal brine composition as defined in claim 25 wherein neither said acid sulfate brine nor said near neutral, bicarbonate brine has been chemically treated.

27. A geothermal brine composition as defined in claim 26 wherein the pH is between 4.5 and 6.0.

28. A geothermal brine composition as defined in claim 26 wherein the pH is between 5.0 and 6.0.

29. A geothermal brine composition as defined in claim 26 wherein said acid sulfate brine has a pH less than 4.5 and said near neutral, bicarbonate brine has a pH of 5.0 to 9.0 and contains more than 300 ppm silica.

30. A geothermal brine composition as defined in claim 26 wherein said acid sulfate brine has a pH less than 3.0 and said near neutral, bicarbonate brine has a pH of 6.0 to 9.0 and contains more than 500 ppm silica.

31. A geothermal brine composition as defined in claim 26 wherein said acid sulfate brine has a pH less than 3.5 and said near neutral, bicarbonate brine has a pH of 7.5 to 9.0 and contains more than 400 ppm silica.

32. A geothermal brine composition as defined in claim 26 wherein said acid sulfate brine has a pH less than 3.5 and said near neutral, bicarbonate brine has a pH of 7.5 to 9.0 and contains more than 600 ppm silica.

* * * * *